United States Patent
Okuda et al.

(10) Patent No.: US 11,945,438 B2
(45) Date of Patent: Apr. 2, 2024

(54) CONTROL APPARATUS FOR VEHICLE

(71) Applicant: TOYOTA JIDOSHA KABUSHIKI KAISHA, Toyota (JP)

(72) Inventors: Koichi Okuda, Toyota (JP); Masafumi Yamamoto, Nagakute (JP); Yoshito Sekiguchi, Kariya (JP); Yuuki Makino, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/332,089

(22) Filed: Jun. 9, 2023

(65) Prior Publication Data

US 2023/0406302 A1 Dec. 21, 2023

(30) Foreign Application Priority Data

Jun. 18, 2022 (JP) ................. 2022-098500

(51) Int. Cl.
*B60W 30/16* (2020.01)
*B60W 10/04* (2006.01)
(Continued)

(52) U.S. Cl.
CPC ............ *B60W 30/16* (2013.01); *B60W 10/04* (2013.01); *B60W 10/10* (2013.01);
(Continued)

(58) Field of Classification Search
CPC ...... B60W 30/16; B60W 10/04; B60W 10/10; B60W 2554/80; B60W 2554/802;
(Continued)

(56) References Cited

U.S. PATENT DOCUMENTS

| 11,643,080 B2 * | 5/2023 | Shieh | G06V 20/584 |
| | | | 701/96 |
| 2012/0136544 A1 * | 5/2012 | Heo | F16H 61/0213 |
| | | | 701/56 |

(Continued)

FOREIGN PATENT DOCUMENTS

JP 2012-201133 A 10/2012

*Primary Examiner* — Roger L Pang
(74) *Attorney, Agent, or Firm* — Oblon, McClelland, Maier & Neustadt, L.L.P.

(57) ABSTRACT

A vehicle control apparatus includes: a follow-up-running control portion configured to execute a follow-up running control for causing a vehicle to run following a preceding vehicle with a target inter-vehicle distance; and a shift control portion configured to change a gear ratio of an automatic transmission in accordance with a predetermined shifting condition. The shift control portion is configured to set a high fluid-temperature determination value, based on information relating to the preceding vehicle that affects an air flow rate. When a fluid temperature of the automatic transmission is not lower than the high fluid-temperature determination value, the shift control portion is configured to change the shifting condition such that a higher-speed gear position making the gear ratio lower is more frequently established in the automatic transmission than when the fluid temperature of the automatic transmission is lower than the high fluid-temperature determination value.

8 Claims, 8 Drawing Sheets

(51) Int. Cl.
*B60W 10/10* (2012.01)
*B60W 50/00* (2006.01)

(52) U.S. Cl.
CPC ..... *B60W 50/0098* (2013.01); *B60W 2552/00* (2020.02); *B60W 2554/404* (2020.02); *B60W 2554/80* (2020.02); *B60W 2710/10* (2013.01)

(58) Field of Classification Search
CPC .......... B60W 30/162; B60W 2710/10; B60W 2556/45; B60W 2554/404; B60W 2552/00
USPC ................................... 701/54, 56, 65, 95, 96
See application file for complete search history.

(56) References Cited

U.S. PATENT DOCUMENTS

2019/0248369 A1* 8/2019 Mizuno ................. B60W 50/00
2023/0341036 A1* 10/2023 Okuda .................... F16H 45/02

* cited by examiner

|  | C1 | C2 | B1 | B2 | F1 |
|---|---|---|---|---|---|
| 1st | O |  |  | (O) | O |
| 2nd | O |  | O |  |  |
| 3rd | O | O |  |  |  |
| 4th |  | O | O |  |  |
| N |  |  |  |  |  |

(O:ENGAGED  BLANK:RELEASED)

《NORMAL-STATE SHIFTING MAP M1》

《HIGH-FLUID-TEMPERATURE-STATE SHIFTING MAP M2》

CONTROL APPARATUS FOR VEHICLE

This application claims priority from Japanese Patent Application No. 2022-098500 filed on Jun. 18, 2022, the disclosure of which is herein incorporated by reference in its entirety.

FIELD OF THE INVENTION

The present invention relates to a control apparatus for a vehicle, and more particularly to a control apparatus capable of executing a follow-up running control for causing a vehicle to run following a preceding vehicle with a target inter-vehicle distance to the preceding vehicle from the vehicle.

BACKGROUND OF THE INVENTION

There is known a control apparatus for a vehicle, which includes a follow-up-running control portion configured to control an output of a drive power source so as to execute a follow-up running control for causing the vehicle to run following a preceding vehicle with a target inter-vehicle distance to the preceding vehicle from the vehicle without requiring an acceleration/deceleration operation by a driver of the vehicle. JP-2012-201133A discloses an example of such a control apparatus, and proposes a technique for adjusting the inter-vehicle distance, for example. In the follow-up running, the preceding vehicle acts as a windshield for reducing a running resistance against the following vehicle, and reducing also a rate of air flow to a cooling system such as a radiator. That is, in the technique proposed in the above-identified Japanese Patent Application Publication, the inter-vehicle distance is adjusted such that a predetermined rate of the air flow is obtained for avoiding reduction of a cooling performance of the cooling system.

SUMMARY OF THE INVENTION

By the way, also in a vehicle having an automatic transmission whose gear ratio is changeable, a fluid temperature of the automatic transmission could be excessively increased by reduction of the air flow rate due to presence of the preceding vehicle during the follow-up running. Therefore, it might be possible to adjust the inter-vehicle distance for obtaining a desired cooling performance, by applying the technique disclosed in the above-identified Japanese Patent Application Publication. However, there is room for improvement, such as a possibility that adjusting the inter-vehicle distance could increase the running resistance and worsen a fuel efficiency of the vehicle.

The present invention was made in view of the background art described above. It is therefore an object of the present invention to suppress an excessive increase of a fluid temperature of an automatic transmission due to a reduction of a cooling performance that could be caused by a reduction of an air flow rate due to presence of a preceding vehicle during a follow-up running.

The object indicated above is achieved according to the following aspects of the present invention.

According to a first aspect of the invention, there is provided a control apparatus for a vehicle that includes a drive power source and an automatic transmission. The control apparatus includes: a follow-up-running control portion configured to control an output of the drive power source so as to execute a follow-up running control for causing the vehicle to run following a preceding vehicle with a target inter-vehicle distance to the preceding vehicle from the vehicle without requiring an acceleration/deceleration operation by a driver of the vehicle; and a shift control portion configured to change a gear ratio of the automatic transmission in accordance with a predetermined shifting condition. During execution of the follow-up running control by the follow-up-running control portion, the shift control portion is configured to set a high fluid-temperature determination value, based on information relating to the preceding vehicle that affects an air flow rate that is a rate of flow of air to the vehicle. When a detected fluid temperature of the automatic transmission is not lower than the high fluid-temperature determination value, the shift control portion is configured to change the shifting condition depending on the fluid temperature such that a higher-speed gear position making the gear ratio lower is more frequently established in the automatic transmission than when the fluid temperature of the automatic transmission is lower than the high fluid-temperature determination value.

It is noted that the present invention can be carried out not only by detecting directly the fluid temperature of the automatic transmission, but also by detection indirectly the fluid temperature by detecting another temperature (such as a temperature of the automatic transmission itself) that is changed together with the fluid temperature. The above-described gear ratio of the automatic transmission is a ratio (=input rotational speed/output rotational speed) of an input rotational speed of the automatic transmission to an output rotational speed of the automatic transmission. The input rotational speed is reduced as the gear ratio is reduced.

According to a second aspect of the invention, in the control apparatus according to the first aspect of the invention, the information relating to the preceding vehicle includes an inter-vehicle distance to the preceding vehicle from the vehicle, wherein the shift control portion is configured to set the high fluid-temperature determination value, depending on the inter-vehicle distance, such that the high fluid-temperature determination value is lower when the inter-vehicle distance is small than when the inter-vehicle distance is large.

According to a third aspect of the invention, in the control apparatus according to the first or second aspect of the invention, the information relating to the preceding vehicle includes a width of a rear portion of the preceding vehicle, wherein the shift control portion is configured to set the high fluid-temperature determination value, depending on the width, such that the high fluid-temperature determination value is lower when the width is large than when the width is small.

According to a fourth aspect of the invention, in the control apparatus according to any one of the first through third aspects of the invention, the information relating to the preceding vehicle includes a projected area of the preceding vehicle as seen from a rear side of the preceding vehicle, wherein the shift control portion is configured to set the high fluid-temperature determination value, depending on the projected area, such that the high fluid-temperature determination value is lower when the projected area is large than when the projected area is small.

According to a fifth aspect of the invention, in the control apparatus according to any one of the first through fourth aspects of the invention, the shift control portion is configured to set the high fluid-temperature determination value, depending on, in addition to the information relating to the preceding vehicle, an expected load expected in future running of the vehicle, such that the high fluid-temperature determination value is lower when the expected load is large than the expected load is small.

According to a sixth aspect of the invention, in the control apparatus according to the fifth aspect of the invention, the expected load is obtained based on a predetermined running route of the vehicle.

According to a seventh aspect of the invention, in the control apparatus according to any one of the first through sixth aspects of the invention, when the shifting condition has been changed by the shift control portion such that the higher-speed gear position is more frequently established in the automatic transmission, the follow-up-running control portion is configured to determine whether continuation of the execution of the follow-up running control is appropriate or not, and to restrict the execution of the follow-up running control when determining that the continuation of the execution of the follow-up running control is not appropriate.

According to an eighth aspect of the invention, in the control apparatus according to any one of the first through seventh aspects of the invention, when the fluid temperature of the automatic transmission becomes not lower than the high fluid-temperature determination value, the shift control portion is configured to change the shifting condition from a normal-state shifting condition to a high-fluid-temperature-state shifting condition by which the higher-speed gear position is more frequently established in the automatic transmission than by the normal-state shifting condition. When the fluid temperature of the automatic transmission becomes not higher than a returning determination value that is lower than high fluid-temperature determination value, the shift control portion is configured to return the shifting condition to the normal-state shifting condition from the high-fluid-temperature-state shifting condition.

In the control apparatus according to any one of the first through eighth aspects of the invention, during the execution of the follow-up running control, the high fluid-temperature determination value is set based on the information relating to the preceding vehicle that affects the air flow rate, and when the detected fluid temperature of the automatic transmission is not lower than the high fluid-temperature determination value, the shifting condition is changed depending on the fluid temperature such that the higher-speed gear position making the gear ratio lower is more frequently established in the automatic transmission than when the fluid temperature of the automatic transmission is lower than the high fluid-temperature determination value. With the higher-speed gear position being more frequently established, namely, with a higher-speed-side gear ratio being more frequently used, the rotational speed (such as the input rotational speed) of each rotary member of the automatic transmission is reduced and accordingly the heat generation due to stirring of the lubrication fluid is suppressed, so that it is possible to suppress increase of the fluid temperature, due to reduction of the cooling performance which could be caused by reduction of the air flow rate during the follow-up running. Particularly, since the high fluid-temperature determination value, based on which it is determined whether the shifting condition is to be changed or not, is set to a value variable depending on the information relating to the preceding vehicle that affects the air flow rate, it is possible to appropriately suppress increase of the fluid temperature due to reduction of the air flow rate during the follow-up running. Therefore, during the follow-up running, it is possible to enjoy a fuel-efficiency increasing effect owing to the preceding vehicle acting as a windshield for reducing a running resistance, and to suppress the fluid temperature from being excessively increased due to reduction of the air flow rate.

In the control apparatus according to the second aspect of the invention, the inter-vehicle distance to the preceding vehicle from the vehicle is used as the information relating to the preceding vehicle that affects the air flow rate, and the high fluid-temperature determination value is set to a value variable depending on the inter-vehicle distance such that the high fluid-temperature determination value is lower when the inter-vehicle distance is small than when the inter-vehicle distance is large, so that the increase of the fluid temperature can be appropriately suppressed. That is, since the reduction of the cooling performance due to presence of the preceding vehicle becomes noticeable when the inter-vehicle distance is small, the increase of the fluid temperature can be appropriately suppressed in spite of the reduction of the cooling performance, by reducing the high fluid-temperature determination value so as to cause the higher-speed gear position to be frequently established in the automatic transmission, namely, so as to cause the higher-speed-side gear ratio to be frequently used, even when the fluid temperature of the automatic transmission is low.

In the control apparatus according to the third aspect of the invention, the width of the rear portion of the preceding vehicle is used as the information relating to the preceding vehicle that affects the air flow rate, and the high fluid-temperature determination value is set to a value variable depending on the width such that the high fluid-temperature determination value is lower when the width is large than when the width is small, so that the increase of the fluid temperature can be appropriately suppressed. That is, since the reduction of the cooling performance due to presence of the preceding vehicle becomes noticeable when the width is large, the increase of the fluid temperature can be appropriately suppressed in spite of the reduction of the cooling performance, by reducing the high fluid-temperature determination value so as to cause the higher-speed gear position to be frequently established in the automatic transmission, namely, so as to cause the higher-speed-side gear ratio to be frequently used, even when the fluid temperature of the automatic transmission is low.

In the control apparatus according to the fourth aspect of the invention, the projected area of the preceding vehicle as seen from the rear side of the preceding vehicle is used as the information relating to the preceding vehicle that affects the air flow rate, and the high fluid-temperature determination value is set to a value variable depending on the projected area such that the high fluid-temperature determination value is lower when the projected area is large than when the projected area is small, so that the increase of the fluid temperature can be appropriately suppressed. That is, since the reduction of the cooling performance due to presence of the preceding vehicle becomes noticeable when the projected area is large, the increase of the fluid temperature can be appropriately suppressed in spite of the reduction of the cooling performance, by reducing the high fluid-temperature determination value so as to cause the higher-speed gear position to be frequently established in the automatic transmission, namely, so as to cause the higher-speed-side gear ratio to be frequently used, even when the fluid temperature of the automatic transmission is low.

In the control apparatus according to the fifth aspect of the invention, the high fluid-temperature determination value is set to a value variable depending on the expected load in addition to the information relating to the preceding vehicle that affects the air flow rate, such that the high fluid-temperature determination value is lower when the expected load is large than when the expected load is small, so that the increase of the fluid temperature can be more appropriately suppressed. That is, when the expected load is large, a lower-speed gear position providing a higher gear ratio becomes more frequently established whereby the fluid temperature is more likely to be increased. Therefore, the increase of the fluid temperature can be appropriately suppressed in spite of increase of the running load, by reducing the high fluid-temperature determination value so as to cause the higher-speed gear position to be frequently established in the automatic transmission, namely, so as to cause the higher-speed-side gear ratio to be frequently used, even when the fluid temperature of the automatic transmission is low.

In the control apparatus according to the sixth aspect of the invention, the expected load is obtained based on the predetermined running route, it is possible to accurately estimate the expected load, so that the increase of the fluid temperature can be appropriately suppressed by appropriately reducing the high fluid-temperature determination value.

In the control apparatus according to the seventh aspect of the invention, during execution of the follow-up running control, when the shifting condition is changed by the shift control portion, it is determined whether the continuation of the execution of the follow-up running control is appropriate or not. When it is determined the continuation is inappropriate, the execution of the follow-up running control is restricted, so that it is possible to avoid problems that could be caused by unreasonable continuation of the follow-up running control, wherein the problems include increase of change of the inter-vehicle distance and increase of change of the torque of the drive power source, which could cause the vehicle driver to feel uncomfortable.

In the control apparatus according to the eighth aspect of the invention, the normal-state shifting condition and the high-fluid-temperature-state shifting condition (by which the higher-speed gear position is frequently established in the automatic transmission) are switched to each other, depending on the fluid temperature. The normal-state shifting condition is changed to the high-fluid-temperature-state shifting condition when the fluid temperature becomes not lower than the high fluid-temperature determination value, and the high fluid-temperature determination value is changed back to the normal-state shifting condition when the fluid temperature becomes not higher than the returning determination value that is lower than high fluid-temperature determination value. Therefore, it is possible to suppress frequent change of the shifting condition by slight fluctuation of the fluid temperature.

DETAILED DESCRIPTION OF PREFERRED EMBODIMENT

Figure 1:
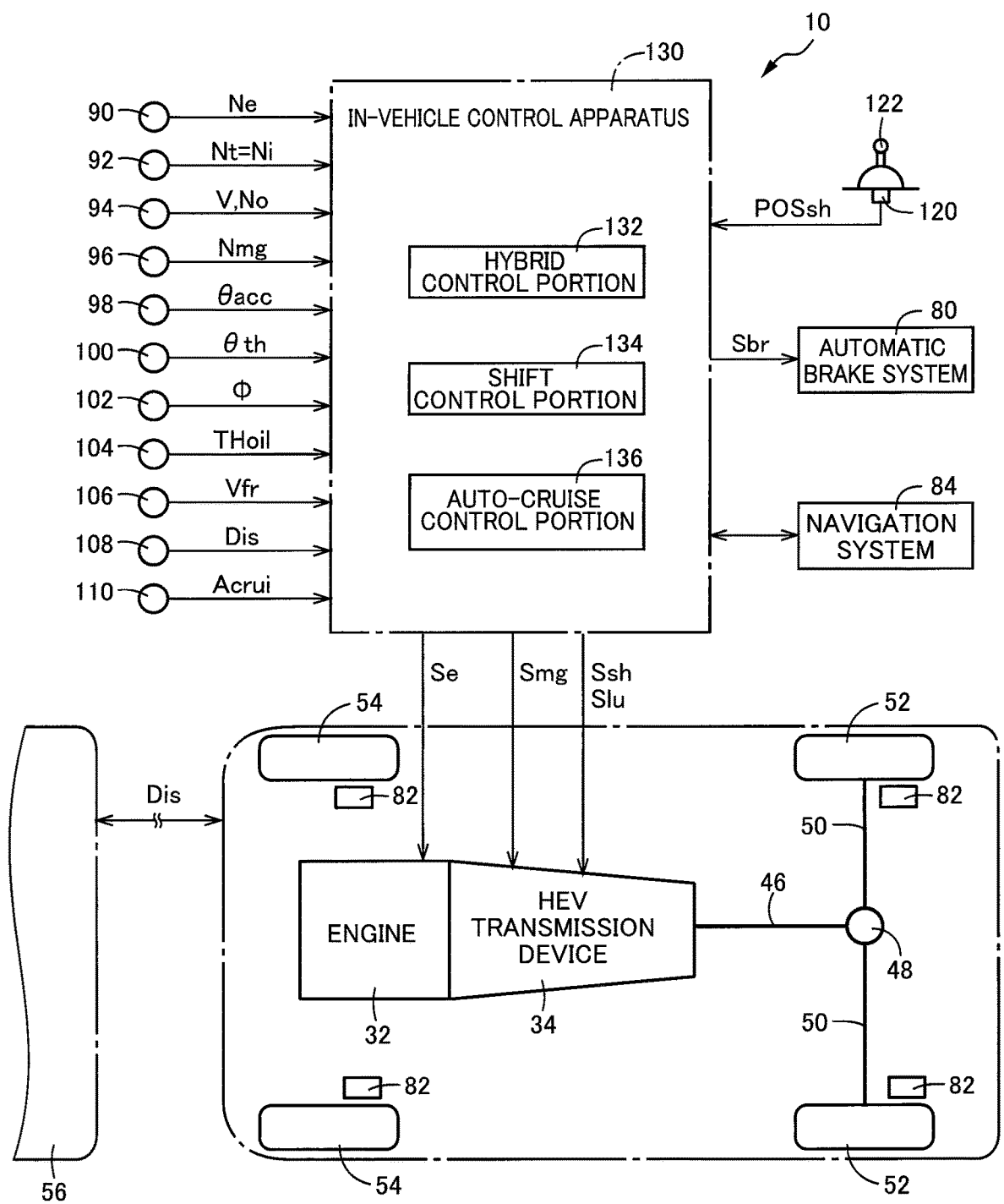
FIG. 1 is a view explaining an example of a hybrid electric vehicle including an in-vehicle control apparatus as a control apparatus that is an embodiment of the present invention, and showing an outline of a drive system and main portions of control functions and system for performing various controls in the vehicle.

The present invention is advantageously applied to a case in which platooning that is the follow-up running performed by a plurality of freight vehicles or buses in a highway road or a motorway road over a relatively long distance. However, the present invention can be applied also to a case in which the follow-up running, which is other than the platooning, performed by any vehicle including a general vehicle such as a passenger car in a highway road or a general road. The present invention is applicable to various kinds of conventional vehicles such as an engine drive vehicle, an electric vehicle and a hybrid electric vehicle that is provided with an engine and a rotating machine serving as drive power sources. It is preferable that the vehicle is operated by a driver who rides on the vehicle. However, the present invention is applicable also to an unmanned vehicle which is equipped with an automatic steering system or the line and which can perform the follow-up running in accordance with a predetermined running route. The present invention is advantageously applicable to a vehicle having the transmission in the form of a step-variable transmission of planetary gear type or two-shaft meshing type in which gear positions are switched depending on engaged/released states of a plurality of frictional engagement devices. However, the invention is applicable also to a vehicle having the transmission in the form of a continuously variable transmission of belt type in which a gear ratio is continuously variable.

The follow-up-running control portion performs the follow-up running control for enabling the vehicle to run with a target inter-vehicle distance to the preceding vehicle, by calculating a drive request amount that is required to keep the inter-vehicle distance at the target inter-vehicle distance, and controlling the output of the drive power source such that the calculated drive request amount is obtained. In addition to follow-up running control, it is also possible to perform an autonomous running control for enabling the vehicle to run at a predetermined target running speed, by calculating the drive request amount required to keep the predetermined target running speed and controlling the output of the drive power source such that calculated drive request amount is obtained. The autonomous running control may be for enabling the vehicle to run at a constant speed as the predetermined target running speed, or for enabling the vehicle to automatically run at a variable speed at the predetermined target running speed, wherein the variable speed is set to a value variable depending on a running route. In the follow-up running control and the autonomous running control, the output of the power source is controlled preferably together with control of a negative torque generated by an engine brake and a regenerative brake of the rotating machine. It is also possible to execute a brake force control through an automatic brake system.

For example, when the fluid temperature becomes not lower than a predetermined high fluid-temperature determination value, the shift control portion selects a high-fluid-temperature-state shifting map that is formulated such that a higher-speed gear position is to be established to reduce a gear ratio, as compared with when the fluid temperature is lower than the high fluid-temperature determination value. It is possible to predefine two kinds of shifting map consisting of the high-fluid-temperature-state shifting map and a normal-state shifting map. It is also possible to offset shift lines to a lower speed side in the normal-state shifting map when the fluid temperature becomes not lower than the high fluid-temperature determination value. Further, the shifting map may be changed not only depending on whether the fluid temperature is at least the high fluid-temperature determination value or not, namely, not only in two stages, but also in three or more stages or even in a continuous manner, depending on the fluid temperature relative to the high fluid-temperature determination value. The high fluid-temperature determination value is set to a value variable depending on the information relating to the preceding vehicle that affects the air flow rate. The information relating to the preceding vehicle that affects the air flow rate may include the inter-vehicle distance to the preceding vehicle from the vehicle, the width of the rear portion of the preceding vehicle, and the projected area of the preceding vehicle as seen from a rear side of the preceding vehicle. The high fluid-temperature determination value may be set to a value variable depending on one or two or more of them. Further, the high fluid-temperature determination value may be set to a value variable depending on other information in place of or in addition to the information relating to the preceding vehicle that affects the air flow rate, wherein the other information may include the expected load that affects the fluid temperature, for example. Further, the increase of the fluid temperature can be suppressed by other control in addition to the change of the shifting map, wherein the other control may include adjusting the inter-vehicle distance as disclosed in the above-identified Japanese Patent Application Publication (JP-2012-201133A).

EMBODIMENT

There will be described an embodiment of the present invention in details with reference to drawings. It is noted that figures of the drawings are simplified or deformed as needed, and each portion is not necessarily precisely depicted in terms of dimension ratio, shape, angle, etc, for easier understanding of the embodiment.

FIG. 1 is a view explaining an example of a vehicle 10 including an in-vehicle control apparatus 130 as a control apparatus that is an embodiment of the present invention, and showing an outline of a drive system and main portions of control functions and system for performing various controls in the vehicle 10. The vehicle 10 is a freight vehicle or the like that is used also in platooning, and is a hybrid electric vehicle of FR (front engine and rear drive) system including an engine 32 and an HEV (Hybrid Electric Vehicle) transmission device 34 connected to the engine 32. To the HEV transmission device 34, a propeller shaft 46 is connected to drive and rotate right and left rear wheels 52 through a differential gear device 48 and right and left drive shafts 50. The engine 32 is an internal combustion engine such as gasoline engine and diesel engine, and is used as a drive power source for driving the vehicle 10. The vehicle 10 is provided with an engine control device (not shown) that includes a throttle actuator, a fuel injection device and an ignition device. With the engine control device being controlled by the in-vehicle control apparatus 130, an engine torque Te, which is an output torque of the engine 32, is controlled.

Figures 2, 3:
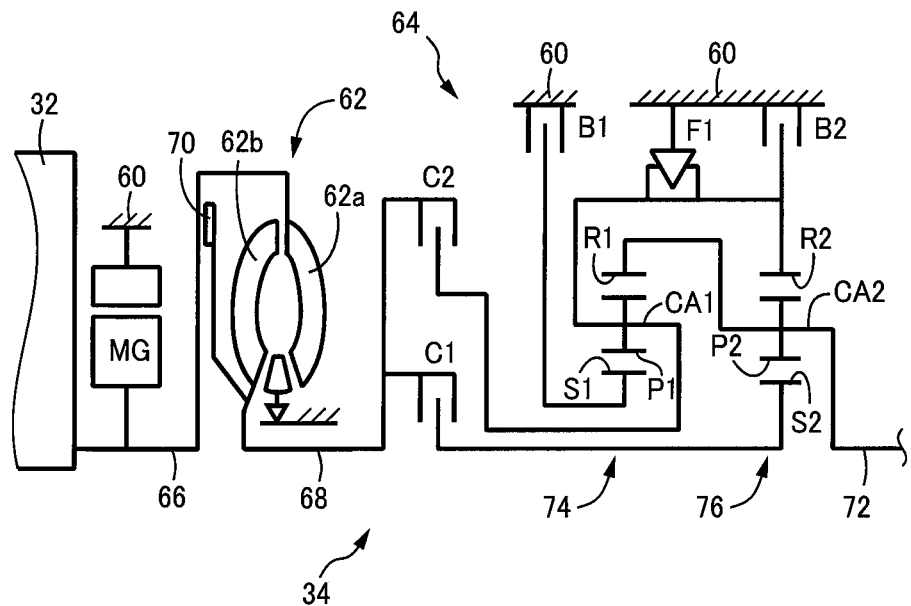
FIG. 2 is a view schematically showing an example of an HEV transmission device shown in FIG. 1.
FIG. 3 is a table indicating a relationship between each gear position of a transmission portion of the HEV transmission device of FIG. 2 and a combination of engagement devices of the transmission portion, which are placed in engaged states to establish the gear position in the transmission portion.

FIG. 2 is a view schematically showing an example of the HEV transmission device 34. As shown in FIG. 2, the HEV transmission device 34 includes a rotating machine MG and a transmission portion 64 that is connected to the rotating machine MG and the engine 32 through a torque converter 62, such that the rotating machine MG, torque converter 62 and transmission portion 64 are disposed within a transmission casing 60 that is a non-rotary member attached to a body of the vehicle 10. Each of the rotating machine MG, torque converter 62 and transmission portion 64 is constructed substantially symmetrically about a center line, so that its lower half (that is located on a lower side of the center line) is not shown in FIG. 2. The rotating machine MG is a motor generator having a function serving as a motor configured to generate a mechanical power from an electric power and a function serving as a generator configured to generate an electric power from a mechanical power, and is constituted by a three-phase AC synchronous motor, for example. An MG torque Tmg and an MG rotational speed Nmg, which are a torque and a rotational speed of the rotating machine MG, are controlled by the in-vehicle control apparatus 130. The rotating machine MG is used as a drive power source, so as to generate a drive power for driving the vehicle 10, in addition to or in place of the engine 32. Further, when being driven and rotated by the power of the engine 32 or by a driven power inputted from the rear wheels 52, the rotating machine MG is subjected to a regenerative control so as to serve as the generator for generating the electric power, and so as to generate a regenerative brake applied to the rear wheels 52. The rotating machine MG is connected to a crankshaft of the engine 32 directly or indirectly through a damper or the like (not shown). An engine connection/disconnection device or the like may be provided to selectively connect and disconnect a power transmission between the rotating machine MG and the engine 32.

The torque converter 62 includes a pump impeller 62a connected to the rotating machine MG through an MG connecting shaft 66, a turbine impeller 62b connected to an input shaft 68 of the transmission portion 64, and an LU (lock-up) clutch 70 configured to connect and disconnect between the pump impeller 62a and the turbine impeller 62b. With an LU hydraulic pressure PRlu being controlled by the in-vehicle control apparatus 130, an LU clutch torque Tlu as a torque capacity of the LU clutch 70 is controlled whereby a controlled state or operation state of the LU clutch 70 is controlled. As the operation state of the LU clutch 70, there are a released state in which the LU clutch 70 is released, a slipped state in which the LU clutch 70 is engaged with slipping, and a lock-up state in which the LU clutch 70 is fully engaged. When the LU clutch 70 is placed in the released state, the torque converter 62 is placed in a torque converter state in which a torque boosting effect is obtained. When the LU clutch 70 is placed in the lock-up state, the torque converter 62 is placed in a direct connection state in which the pump impeller 62a and the turbine impeller 62b are rotated integrally with each other.

The transmission portion 64 is configured to change stepwise an input rotational speed Ni, which is a rotational speed of the input shaft 68, and to transmit it to an output shaft 72 whereby the power is transmitted from the output shaft 72 to the propeller shaft 46. The transmission portion 64 is a step-variable automatic transmission including first and second planetary gear devices 74, 76 of single pinion type, and is configured to establish a plurality of gear positions that are different in a gear ratio γ (=input rotational speed Ni/output rotational speed No). The input rotational speed Ni is equal to a turbine rotational speed Nt that is an output rotational speed of the torque converter 62. The output rotational speed No is a rotational speed of the output shaft 72, and corresponds to a running speed V of the vehicle 10. The first planetary gear device 74 includes three rotary elements in the form of a first sun gear S1, a first carrier CA1 and a first ring gear R1, wherein the first carrier CA1 holds first pinion gears P1 such that each of the first pinion gears P1 are rotatable about its axis and is revolvable about an axis of the first planetary gear device 74 and such that each of the first pinion gears P1 meshes with the first sun gear S1 and the first ring gear R1. The second planetary gear device 76 includes three rotary elements in the form of a second sun gear S2, a second carrier CA2 and a second ring gear R2, wherein the second carrier CA2 holds second pinion gears P2 such that each of the second pinion gears P2 are rotatable about its axis and is revolvable about an axis of the second planetary gear device 76 and such that each of the second pinion gears P2 meshes with the second sun gear S2 and the second ring gear R2.

The first sun gear S1 of the first planetary gear device 74 is selectively connected to the casing 60 through a first brake B1. The first carrier CA1 of the first planetary gear device 74 and the second ring gear R2 of the second planetary gear device 76, which are connected integrally with each other, are selectively connected to the input shaft 68 through a second clutch C2, and are selectively connected to the casing 60 through a second brake B2. The first carrier CA1 and the second ring gear R2 are further connected to the casing 60 as the non-rotary member through a one-way clutch F1, so as to be allowed to be rotated in the same direction as the engine 32 and inhibited from being rotated in the opposite direction. The first ring gear R1 of the first planetary gear device 74 and the second carrier CA2 of the second planetary gear device 76, which are connected integrally with each other, are connected to the output shaft 72. The second sun gear S2 of the second planetary gear device 76 is selectively connected to the input shaft 68 through a first clutch C1. The first clutch C1, second clutch C2, first brake B1 and second brake B2 (hereinafter collectively referred to as "engagement devices CB" unless they are to be distinguished from one another) are hydraulically-operated frictional engagement devices each of which is to be operated by a hydraulic actuator. FIG. 3 is a table indicating a relationship between each gear position of the transmission portion 64 and a combination of ones of the engagement devices CB, which are placed in the engaged states to establish the gear position in the transmission portion 64. As shown in the table of FIG. 3, each of four forward-drive gear positions, i.e., a first gear position 1st, a second gear position 2nd, a third gear position 3rd and a fourth gear position 4th, is established by engagements of corresponding one of the engagement device CB, which are indicated by "○" in the table. Further, with all of the engagement devices CB being released, the transmission portion 64 is placed in a neutral position N in which the power transmission is disconnected. It is noted, in the table of FIG. 3, "(○)" (circle with parentheses) represents the engagement of the second brake B2 when an engine brake is to be activated. Thus, the transmission portion 64 is a step variable transmission in which one of the plurality of forward-drive gear positions is to be established depending on engaged/released states of the respective engagement devices CB.

Referring back to FIG. 1, the vehicle 10 is provided with the in-vehicle control apparatus 130 as the control apparatus configured to execute various controls in the vehicle 10. The in-vehicle control apparatus 130 is an electronic control apparatus including a so-called microcomputer incorporating a CPU, a ROM, a RAM and an input-output interface. The CPU performs various control operations of the vehicle 10, by processing various input signals, according to control programs stored in the ROM, while utilizing a temporary data storage function of the RAM. The in-vehicle control apparatus 130 may be constituted by two or more electronic control units, as needed, which are exclusively assigned to perform respective different control operations such as an engine control operation, an MG control operation and a hydraulic control operation.

The in-vehicle control apparatus 130 receives various input signals based on values detected by respective sensors provided in the vehicle 10. Specifically, the in-vehicle control apparatus 130 receives: an output signal of an engine speed sensor 90 indicative of an engine rotational speed Ne which is a rotational speed of the engine 32; an output signal of a turbine speed sensor 92 indicative of a turbine rotational speed Nt that is equal to the AT input rotational speed Ni; an output signal of an output speed sensor 94 indicative of the output rotational speed No that corresponds to the running speed V of the vehicle 10; an output signal of a MG speed sensor 96 indicative of an MG rotational speed Nm which is a rotational speed of the rotating machine MG; an output signal of an accelerator-opening degree sensor 98 indicative of an accelerator opening degree θacc representing an output amount required by the vehicle driver; an output signal of a throttle-opening degree sensor 100 indicative of a throttle opening degree θth which is an opening degree of an electronic throttle valve; an output signal of a road slope sensor 102 indicative of a road slope Φ; an output signal of a fluid temperature sensor 104 indicative of a fluid temperature THoil of the transmission portion 64; an output signal of a forward-image pickup camera 106 representing a video image Vfr of a front side of the vehicle 10; an output signal of an inter-vehicle distance sensor 108 (such as a millimeter wave radar) indicative of an inter-vehicle distance to a preceding vehicle 56 from the vehicle 10; an output signal of an auto-cruise setting device 110 indicative of auto-cruise setting information Acrui; and an output signal of a lever position sensor 120 indicative of a selected one of a plurality of operation positions POSsh of a shift lever 122 that is provided in the vehicle 10. The fluid temperature THoil is a temperature of a lubrication oil or fluid used for lubricating the transmission portion 64, for example.

The shift lever 122 is disposed in vicinity of a driver's seat of the vehicle 10, and is a shift operating member that is to be operated by the vehicle driver so as to switch a shift range in which the power is transmittable in the transmission portion 64. The shift lever 122 is to be placed by the vehicle driver into one of the operation positions POSsh that include, for example, a P position, an R position, a N position and a D position. When the shift lever 122 is placed in the P position, the transmission portion 64 is placed in a neutral state in which the power transmission is disconnected and a P (parking) range is selected to mechanically inhibit rotation of the output shaft 72, wherein the neutral state is a state in which all of the engagement devices CB of the transmission portion 64 are released, for example. When the shift lever 122 is placed in the R position, an R (reverse) range is selected for reverse running of the vehicle 10. When the shift lever 122 is placed in the N position, the transmission portion 64 is placed in the neutral state (as when the shift lever 122 is placed in the P position) and a N (neutral) range is selected. When the shift lever 122 is placed in the D position, a D (drive) range is selected to establish one of the four forward-drive gear positions 1st-4th which is to be automatically selected in accordance with a predetermined shifting condition depending on an operation state such as the vehicle running speed V and a requested drive torque Trdem.

The auto-cruise setting device 110 is a device that is to be operated to select an auto-cruise running for causing the vehicle 10 to run at a constant running speed and to perform a follow-up running. The auto-cruise running is a kind of automatic drive control for automatically controlling the engine 32 and the rotating machine MG as the drive power sources so as to cause the vehicle 10 to run in a predetermined target running state without requiring an acceleration/deceleration operation by the vehicle driver. That is, in the present embodiment, the vehicle 10 can be driven with execution of the auto-cruise running in which the engine 32 and the rotating machine MG are automatically controlled depending on, for example, a target running speed Vt of the vehicle 10, in addition to being manually driven with the engine 32 and the rotating machine MG being controlled in accordance with the acceleration/deceleration operation of an acceleration pedal, for example, by the vehicle driver. The auto-cruise setting device 110 is a device for not only selecting the auto-cruise running but also setting or changing the target running speed Vt and a target inter-vehicle distance Dt in the follow-up running in which the vehicle 10 runs following a preceding vehicle. The auto-cruise setting device 110 is provided in a steering wheel, for example, so that the auto-cruise information Acrui containing the target running speed Vt and the target inter-vehicle distance Dt can be inputted thereto by the vehicle driver.

The in-vehicle control apparatus 130 generates various output signals to the various devices provided in the vehicle 10, such as: an engine control command signal Se for controlling the engine 32; an MG control command signal Smg for controlling the rotating machine MG; an LU control command signal Slu for controlling the LU clutch 70; and a shift control command signal Ssh for changing the gear positions of the transmission portion 64. The vehicle 10 is provided with an automatic brake system 80 that relates to the auto-cruise running. The automatic brake system 80 is configured to electrically control a brake force, i.e., a brake hydraulic pressure of each of wheel brakes 82 that are provided for the rear wheels 52 and front wheels 54, in accordance with an automatic brake control command signal Sbr supplied from the in-vehicle control apparatus 130. Each of the wheel brakes 82 receives the brake hydraulic pressure that is supplied through a brake master cylinder in response to a stepping operation of a brake pedal (not shown) by the vehicle driver, and mechanically generates a brake force based on the supplied brake hydraulic pressure, i.e., a brake operation force.

For performing various control operations in the vehicle 10, the in-vehicle control apparatus 130 functionally includes a hybrid control portion 132, a shift control portion 134 and an auto-cruise control portion 136.

The hybrid control portion 132 has a function of controlling cooperative operations of the engine 32 and the rotating machine MG. The hybrid control portion 132 calculates a drive request amount requested to the vehicle 10 by the vehicle driver, by applying the accelerator opening degree θacc and the vehicle running speed V to a drive request amount map, for example, wherein the drive request amount is a requested drive force Frdem or requested drive torque Trdem that is to be applied to the rear wheels 52, for example. The hybrid control portion 132 obtains a requested TC input torque Ttcdem that is a required value of the input torque required to be inputted to the torque converter 62 for realizing the requested drive torque Trdem, for example, by taking account of various factors such as a transmission loss, an auxiliary load, the gear ratio γ of the transmission portion 64 and a torque ratio of the torque converter 62, and outputs the engine control command signal Se and the MG control command signal Smg for controlling the engine 32 and the rotating machine MG, respectively, such that the requested TC input torque Ttcdem can be obtained.

When the requested TC input torque Ttcdem can be covered by only the output of the rotating machine MG, the hybrid control portion 132 establishes a BEV (Battery Electric Vehicle) driving mode as a motor driving mode for causing the vehicle 10 to run by driving the rotating machine MG. In the BEV driving mode, a BEV driving is performed to drive the vehicle 10 by using only the rotating machine MG as the drive power source while stopping the engine 32. Where the engine connection/disconnection device is provided between the engine 32 and the rotating machine MG, it is preferable to release the engine connection/disconnection device to disconnect the engine 32 from a power transmission path, for thereby preventing drag of the engine 32. In the BEV driving mode, the MG torque Tmg is controlled such that the requested TC input torque Ttcdem is realized. When the requested TC input torque Ttcdem cannot be covered without using at least the output of the engine 32, the hybrid control portion 132 establishes an HEV (Hybrid Electric Vehicle) driving mode as an engine driving mode for causing the vehicle 10 to run by using at least the engine 32 as the drive power source. In the HEV driving mode, the engine torque Te is controlled to realize all or a part of the requested TC input torque Ttcdem by the engine torque Te, and the MG torque Tmg is also controlled to compensate an insufficiency of the engine torque Te to the requested TC input torque Ttcdem, as needed. On the other hand, even when the requested TC input torque Ttcdem can be covered by only the output of the rotating machine MG, the hybrid control portion 132 establishes the HEV driving mode, for example, in a case in which the engine 32 or other parts of the transmission portion 64 is required to be warmed up. Thus, the hybrid control portion 132 is configured, during the HEV driving, to automatically stop the engine 32 and to restart the engine 32 after having stopped the engine 32, and is configured, during the BEV driving, to start the engine 32 and to automatically stop and start the engine 32 when the vehicle 10 is being stopped. Thus, the hybrid control portion 132 switches between the BEV driving mode and the HEV driving mode, depending on the requested TC input torque Ttcdem or the like.

Figure 4:
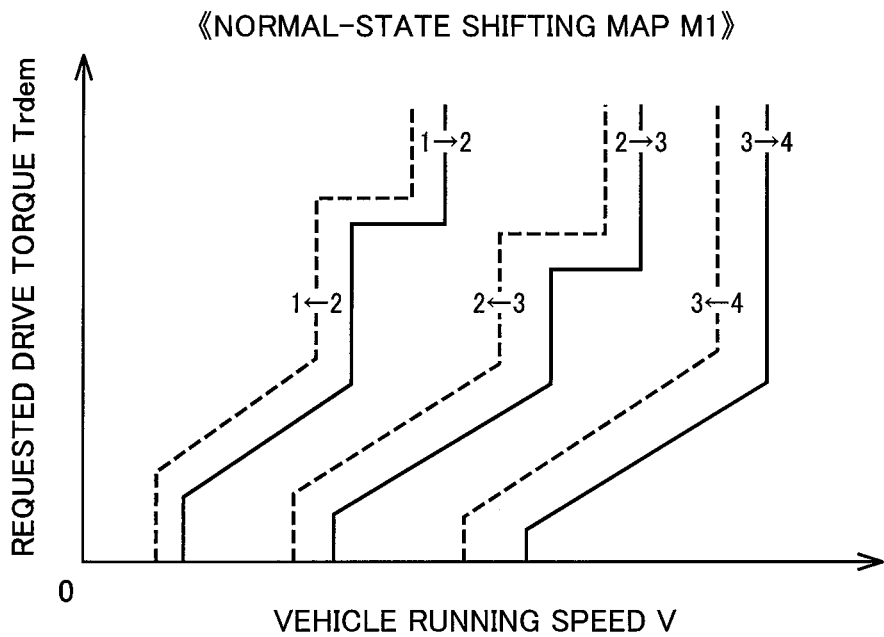
FIG. 4 is a view explaining an example of a normal-state shifting map M1 that is used by a shift control portion included in an in-vehicle control apparatus shown in FIG. 1 when a shift control is executed for a transmission portion shown in FIG. 2.

The shift control portion 134 is configured, when the D range is selected, to determine whether a shifting action is required or not in the transmission portion 64, by using the predetermined shifting condition such as a shifting map, which is predetermined with variables (relating to an operation state of the vehicle 10) such as the vehicle running speed V and the requested drive torque Trdem, and to execute an automatic shift control for outputting the shift control command signal Ssh, as needed, by which a currently established one of the forward-drive gear positions is to be automatically switched to another one of the forward-drive gear positions in the transmission portion 64. FIG. 4 shows an example of the shifting map for the transmission portion 64 that is the step-variable transmission having the four forward-drive gear positions, wherein the shifting map is formulated with variables in the form of the requested drive torque Trdem and the running speed V, and wherein each of solid lines represents a shift-up line based on which it is determined whether a shift-up action is to be executed or not and each of broken lines represents a shift-down line based on which it is determined whether a shift-down action is to be executed or not. This shifting map is formulated such that each of the drive power sources (engine 32 and rotating machine MG) is operated in an appropriate operation region (e.g., an appropriate torque region and an appropriate rotational speed region) depending on requested drive torque Trdem and the vehicle running speed V. Specifically, the shifting map is formulated such that a higher-speed gear position is to be established to reduce the gear ratio γ, with increase of the vehicle running speed V or with reduction of the requested drive torque Trdem, and such that a lower-speed gear position is to be established to increase the gear ratio γ, with reduction of the vehicle running speed V or with increase of the requested drive torque Trdem. In FIG. 4, numerals "1", "2", "3" and "4" represent the first gear position 1st, second gear position 2nd, third gear position 3rd and fourth gear position 4th, respectively. The requested drive torque Trdem, which is one of the above-described variables, corresponds to a drive request amount, and may be replaced by the requested drive force Frdem or the accelerator opening degree θacc. Further, the vehicle running speed V, which is another one of the above-described variables, may be replaced by the output rotational speed No.

Further, when a shifting command signal is supplied to the shift control portion 134 upon operation of the shift lever 122 or another manual shifting operation member disposed in vicinity of the driver's seat by the vehicle driver, the shift control portion 134 executes a manual shift control for switching a currently established one of the forward-drive gear positions to another one of the forward-drive gear positions in the transmission portion 64, in response to the shifting command signal.

The auto-cruise control portion 136 is configured to execute an auto-cruise running as a kind of automatic drive control. The auto-cruise running is an autonomous running of the vehicle 10 without requiring an acceleration/deceleration operation by the vehicle driver. The auto-cruise control portion 136 executes a constant-speed running control for causing the vehicle 10 to run at a constant speed in the form of a target running speed Vt that is set by the auto-cruise setting device 110, and a follow-up running control for controlling the follow-up running in which the vehicle 10 runs keeping a target inter-vehicle distance Dt that is set by the auto-cruise setting device 110. In the constant-speed running control, the auto-cruise control portion 136 calculates the requested drive torque Trdem that is required to enable the vehicle 10 to run at the target constant running speed Vt, and calculates the requested TC input torque Ttcdem that is required to realize the requested drive torque Trdem by taking account of various factors such as a transmission loss, an auxiliary load, the gear ratio γ of the transmission portion 64 and the torque ratio of the torque converter 62. Then, the auto-cruise control portion 136 outputs the engine control command signal Se and the MG control command signal Smg for controlling the engine 32 and the rotating machine MG, respectively, such that the requested TC input torque Ttcdem is obtained. The requested drive torque Trdem is obtained, for example, based on a difference between the target running speed Vt and the running speed V, through a feedback or feedforward control, for example. On the other hand, in the follow-up running control for controlling the follow-up running in which the vehicle 10 runs keeping a target inter-vehicle distance Dt, the auto-cruise control portion 136 calculates the requested drive torque Trdem that is required to enable the vehicle 10 to perform the follow-up running with the inter-vehicle distance Dis being the target inter-vehicle distance Dt, and controls the engine torque Te and the MG torque Tmg such that the requested drive torque Trdem is obtained. The target inter-vehicle distance Dt is set to a value variable depending on, for example, the running speed V. Further, when the requested drive torque Trdem is a negative (minus) value, for example, upon deceleration of the preceding vehicle 56, the auto-cruise control portion 136 causes an engine brake to be generated or a regenerative brake to be generated by the rotating machine MG, optionally together with a brake force generated by each of the wheel brakes 82 controlled by the automatic brake system 80, as needed, such that the negative requested drive torque Trdem is obtained. It is noted that the auto-cruise control portion 136 corresponds to "follow-up-running control portion" recited in the appended claims.

Figure 5:
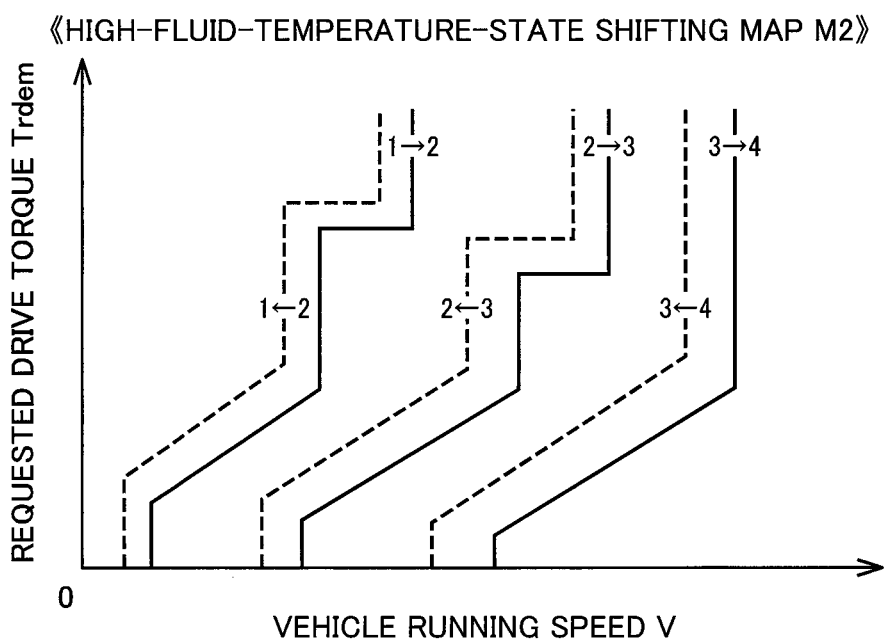
FIG. 5 is a view explaining an example of a high-fluid-temperature-state shifting map M2 that is used in place of the normal-state shifting map M1 of FIG. 4 when a fluid temperature is high.

During execution of the auto-cruise running, the manual shift control by the shift control portion 134 is inhibited, the automatic shift control is executed whereby a currently established one of the four forward-drive gear positions is automatically switched to another one of the four forward-drive gear positions in the transmission portion 64, in accordance with a predetermined normal-state shifting map M1 shown in FIG. 4. During the follow-up running that is running of the vehicle 10 following the preceding vehicle 56, particularly, during platooning in which the follow-up running is performed in a highway road or a motorway road over a relatively long distance, the fluid temperature THoil could be excessively increased by reduction of an air flow rate due to presence of the preceding vehicle 56. Therefore, in the present embodiment, apart from the normal-state shifting map M1, a high-fluid-temperature-state shifting map M2 shown in FIG. 5 is prepared, such that the shift control portion 134 executes the automatic shift control for the transmission portion 64 in accordance with a selected one of the shifting maps M1 and M2 that is selected depending on the fluid temperature THoil, during the follow-up running. In the high-fluid-temperature-state shifting map M2 of FIG. 5, shifting lines (consisting of the above-described shift-up lines and shift-down lines) are offset toward a lower running speed side, so that a shift-up action becomes executed at a lower running speed, namely, a higher-speed gear position becomes more frequently established, as compared with in the normal-state shifting map M1 of FIG. 4. In the high-fluid-temperature-state shifting map M2 of FIG. 5, all of the shifting lines are parallelly offset toward the lower running speed side. However, all of the shifting lines do not necessarily have to be offset toward the lower running speed side, but only the shift-up lines or the shift-down lines, or only a part of each of the shifting lines (for example, a part of each of the shifting lines located in a region in which the requested drive torque Trdem is high), or only some of the shift lines (for example, the shift-up lines and shift-down lines between the third gear position 3rd and the fourth gear position 4th), may be offset toward the lower running speed side. That is, the high-fluid-temperature-state shifting map M2 may take any one of various forms. It is noted that the normal-state shifting map M1 and the high-fluid-temperature-state shifting map M2 correspond to "normal-state shifting condition" and "high-fluid-temperature-state shifting map", respectively, which are recited in the appended claims.

Figure 6:
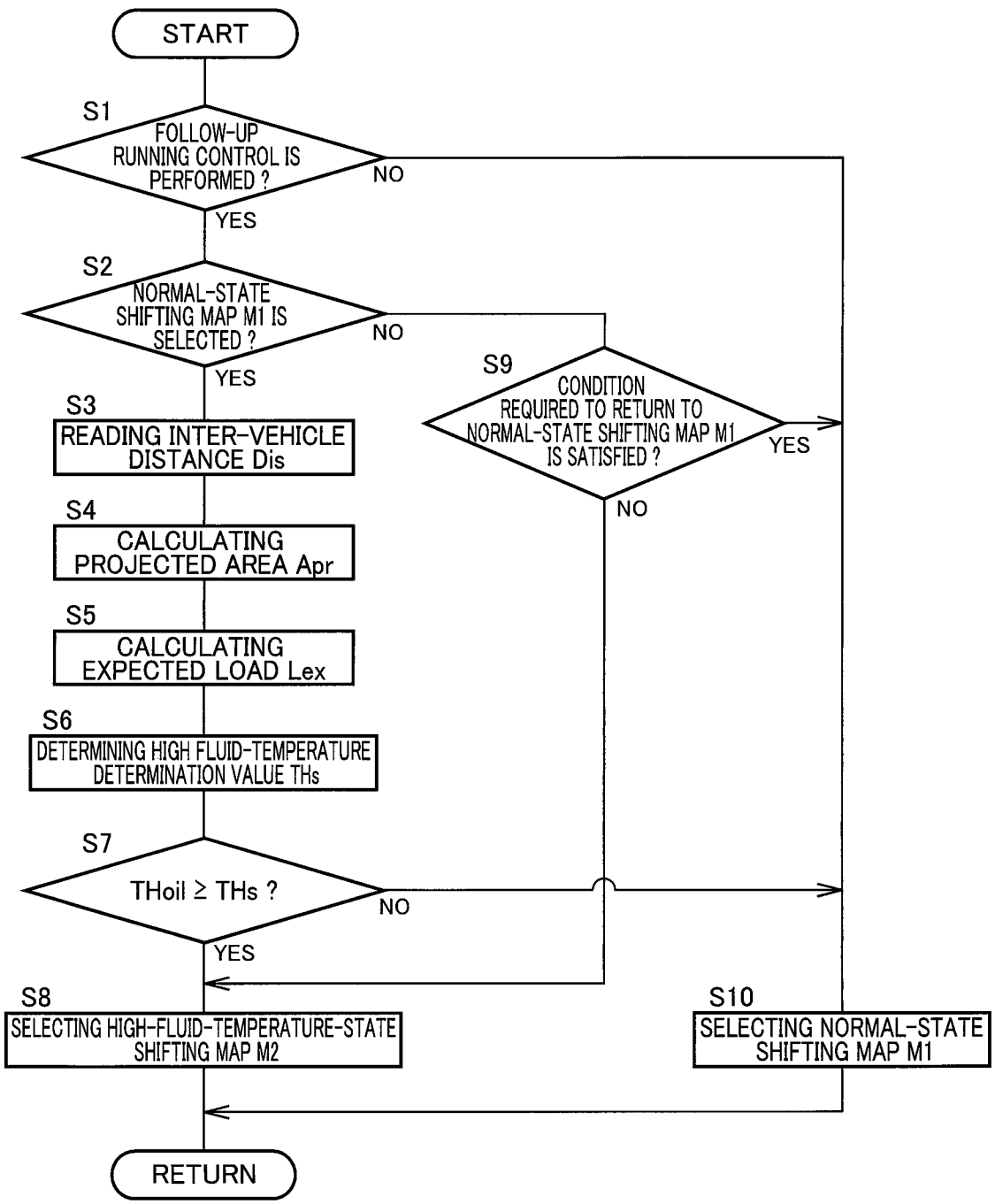
FIG. 6 is a flow chart showing a control routine executed for determining which one of the shifting maps of FIGS. 4 and 5 is to be used when the shift control is executed by the shift control portion included in the in-vehicle control apparatus shown in FIG. 1.

The shift control portion 134 selects the shifting map through a control routine shown in a flow chart of FIG. 6, wherein the control routine includes steps S1 to S10. Then, the shift control portion 134 executes the automatic shift control using the selected shifting map. It is noted that, in the flow chart of FIG. 6, "YES" and "NO" in each of determination steps S1, S2, S7 and S9 (represented by rhombus shapes) represent affirmative determination and negative determination, respectively.

As shown in FIG. 6, the control routine is initiated with step S1 that is implemented by the auto-cruise control portion 136 to determine whether the follow-up running executing the follow-up running control is being performed or not. Whether the follow-up running is being performed or not can be determined, for example, based on an operation state of the auto-cruise setting device 110, a running state of the vehicle 10, an operation state of the auto-cruise control portion 136, or a follow-up running flag that is placed in ON or OFF depending on whether the follow-up running control is being executed or not. When the follow-up running is not being performed, the control flow goes to step S10 that is implemented to select the normal-state shifting map M1 of FIG. 4. When the follow-up running is being performed, step S2 and the subsequent steps are implemented. At step S2, it is determined whether the normal-state shifting map M1 is being selected or not. When the normal-state shifting map M1 is being selected, step S3 and the subsequent steps are implemented. When the normal-state shifting map M1 is not being selected, namely, when the high-fluid-temperature-state shifting map M2 is being selected, the control flow goes to step S9.

At step S9, it is determined whether a returning condition required to return to the normal-state shifting map M1 is satisfied or not. When the returning condition is not satisfied, step S8 is implemented to maintain selection of the high-fluid-temperature-state shifting map M2. When the returning condition is required, step S10 is implemented to select the normal-state shifting map M1. The high-fluid-temperature-state shifting map M2 is selected at step S8 when an affirmative determination is made at step S7 that is implemented to determine whether the fluid temperature THoil is at least a high fluid-temperature determination value THs or not. Although the returning condition may be that the fluid temperature THoil is lower than the high fluid-temperature determination value THs, the returning condition is that the fluid temperature THoil is lower than a returning determination value THre that is lower than the high fluid-temperature determination value THs in the present embodiment, for preventing frequent switching between the shifting maps M1 and M2. The returning determination value THre is a pre-determined value that is lower than the high fluid-temperature determination value THs by a constant value or a constant ratio. Further, it is preferable to return to the normal-state shifting map M1, for example, in a case in which continuation of the automatic shift control with the shifting map other than the normal-state shifting map M1 is not appropriate, irrespective of whether the returning condition relating to the fluid temperature THoil is satisfied or not. For example, in event of failure of a solenoid valve, a rotational speed sensor or the like that is involved in the shift control, there is a possibility that the automatic shift control as such could not be appropriately executed. In such an event of the failure, various controls are executed on an assumption that shift control is executed in accordance with the normal-state shifting map M1. Therefore, also in the event of the failure of a part involved in the shift control, the returning condition may be determined to be satisfied, so that an affirmative determination is made at step S9 and the normal-state shifting map M1 is selected at step S10.

When an affirmative determination is made at step S2, namely, when the normal-state shifting map M1 is being selected, step S3 is implemented to read the inter-vehicle distance Dis to the preceding vehicle 56, step S4 is implemented to calculate a projected area Apr of the preceding vehicle 56 as seen from a rear side of the preceding vehicle 56, and step S5 is implemented to calculate an expected load Lex expected in future running of the vehicle 10. The inter-vehicle distance Dis, which is to be detected by the inter-vehicle distance sensor 108, may be either an instantaneous value, or an average value during running of the vehicle 10 for a predetermined constant time or over a predetermined constant distance. Although the projected area Apr can be obtained, for example, from the video image Vfr taken by the forward-image pickup camera 106, the projected area Apr can be calculated also from a width Wpr and a height Hpr of a rear portion of the preceding vehicle 56 that are measured by a sensor or the like. Further, where the projected area Apr of the preceding vehicle 56 is pre-stored together with data (e.g., a vehicle type, an identification number) relating to the preceding vehicle 56, it is possible to read the projected area Apr from the data. Moreover, the projected area Apr can be obtained also through a vehicle-to-vehicle communication between the vehicle 10 and the preceding vehicle 56. Thus, the projected area Apr can be obtained in any one of various manners. The expected load Lex can be calculated, for example, from a running route that is pre-set in a navigation system 84 having road information including an altitude. Specifically, for example, a total energy [J] required for running, an average output [W] required for engine 32 and the rotating machine MG, a running resistance [N] such as air resistance, power transmission loss and rolling resistance, a total running distance [km] and/or a cumulative height difference [m] can be used as the expected load Lex. Further, for the expected load Lex, for example, a moving average of several kilometers to several tens of kilometers from a current location may be used. Still further, where running load data in past is stored, the expected load Lex can be obtained from the past running load data on the same running route. Moreover, where the running load data is stored in a server of a platoon control center or the like, the expected load Lex can be obtained from the server via a wireless communication line.

Figure 8:
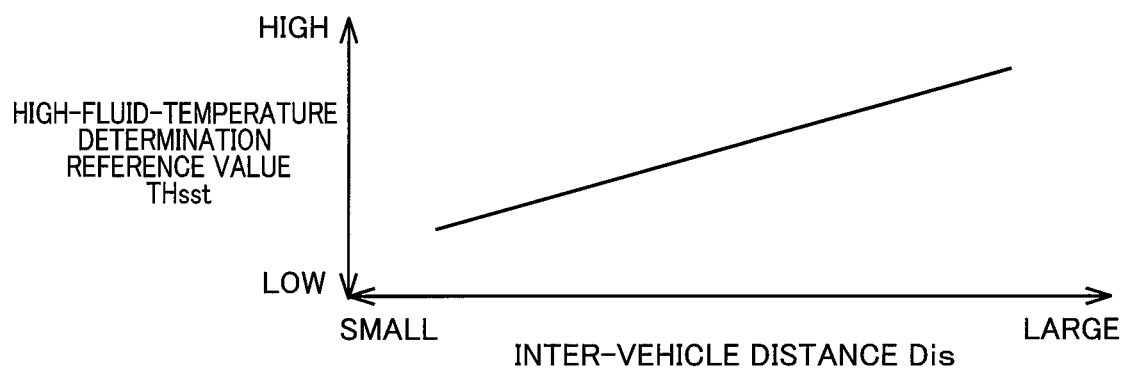
FIG. 8 is a view explaining a high-fluid-temperature determination reference value THsst that is obtained depending on an inter-vehicle distance Dis when a high fluid-temperature determination value THs is determined at step S6 in the control routine of FIG. 6.
Figure 9:
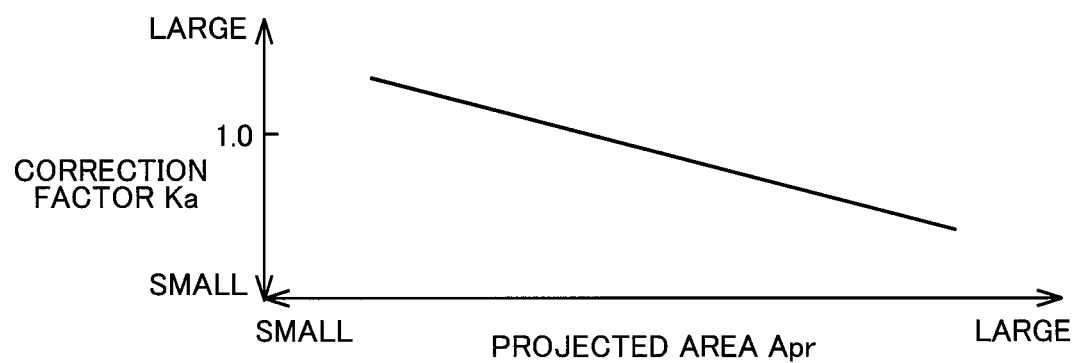
FIG. 9 is a view explaining a correction factor Ka that is obtained depending on a projected area Apr when the high fluid-temperature determination value THs is determined at step S6 in the control routine of FIG. 6.
Figure 10:
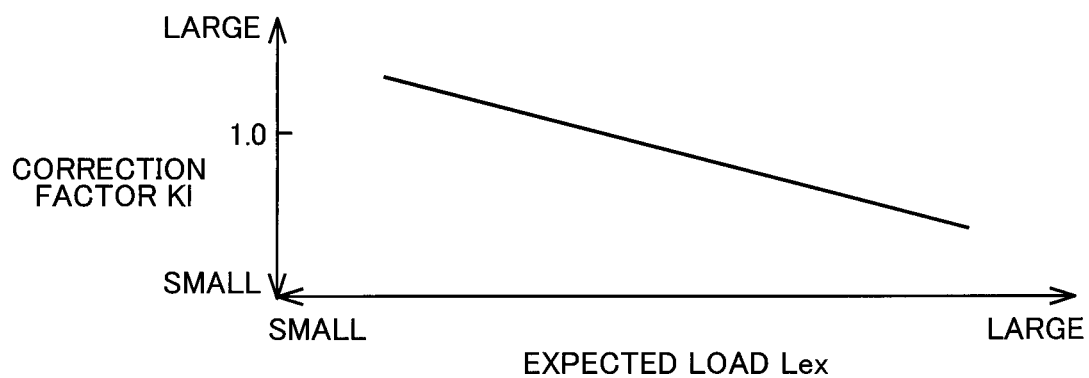
FIG. 10 is a view explaining a correction factor Kl that is obtained depending on an expected load Lex when the high fluid-temperature determination value THs is determined at step S6 in the control routine of FIG. 6.

The above-described inter-vehicle distance Dis, projected area Apr and expected load Lex are all fluid-temperature influence factors that affect the fluid temperature THoil during the follow-up running. Among these fluid-temperature influence factors, the inter-vehicle distance Dis and the projected area Apr correspond to information relating to the preceding vehicle 56 that affects the air flow rate of the vehicle 10. Then, at step S6, the high fluid-temperature determination value THs is calculated based on the inter-vehicle distance Dis, projected area Apr and expected load Lex. For example, a high-fluid-temperature determination reference value THsst is obtained based on the inter-vehicle distance Dis in accordance with a predefined map or relational expression as shown in FIG. 8. Then, a correction factor Ka is obtained based on the projected area Apr in accordance with a predefined map or relational expression as shown in FIG. 9, and a correction factor Kl is obtained based on the expected load Lex in accordance with a predefined map or relational expression as shown in FIG. 10. The high fluid-temperature determination value THs is calculated by multiplying the high-fluid-temperature determination reference value THsst by the correction factor Ka and the correction factor Kl, as in expression (1) given below. Regarding the inter-vehicle distance Dis, the air flow rate is reduced as the inter-vehicle distance Dis is reduced, and the fluid temperature THoil is more likely to be increased with reduction of the air flow rate, so that the high-fluid-temperature determination reference value THsst is reduced as the inter-vehicle distance Dis reduced, as shown in FIG. 8. Regarding the projected area Apr, the air flow rate is reduced as the projected area Apr is increased, and the fluid temperature THoil is more likely to be increased with reduction of the air flow rate, so that the correction factor Ka is smaller than 1.0 as the projected area Apr is increased, as shown in FIG. 9, whereby the high fluid-temperature determination value THs is lower as the projected area Apr is larger. Regarding the expected load Lex, the fluid temperature THoil is more likely to be increased with increase of the expected load Lex, because a lower-speed gear position is more frequently established as the expected load Lex is larger, and a rotational speed of each rotary member of the transmission portion 64 and a rotational speed of the torque converter 62 are increased with a lower-speed gear position being established, so that the lubrication fluid is stirred more as a lower-speed gear position is more frequently established. Thus, the correction factor Kl is smaller than 1.0 as the expected load Lex is increased, as shown in FIG. 10, whereby the high fluid-temperature determination value THs is lower as the expected load Lex is larger.

$$THs = THsst \times Ka \times Kl \qquad (1)$$

Figure 11:
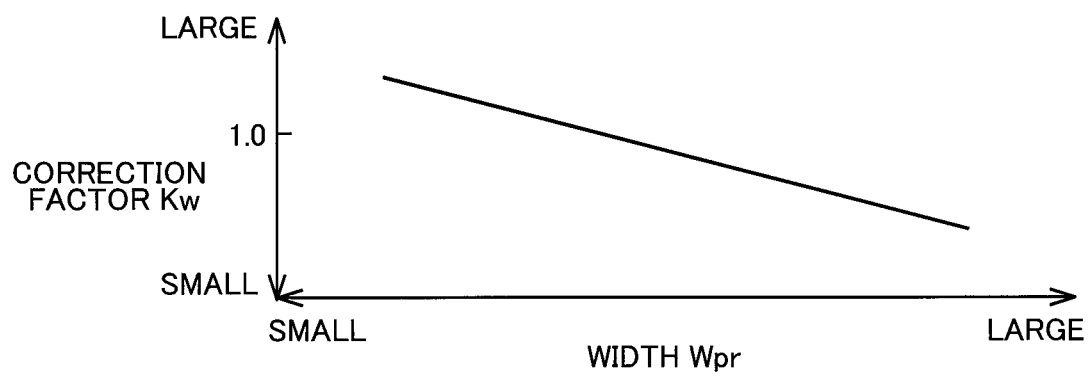
FIG. 11 is a view explaining a correction factor Kw that is obtained depending on a width Wpr when the high fluid-temperature determination value THs is determined by taking account of the width Wpr at step S6 in the control routine of FIG. 6.

In FIG. 8, the high-fluid-temperature determination reference value THsst is determined depending on the inter-vehicle distance Dis. However, it is also possible to pre-set the high-fluid-temperature determination reference value THsst to a constant value, and to obtain a correction factor Kd for the inter-vehicle distance Dis (as well as the correction factor Ka for the projected area Apr and the correction factor Kl for the expected load Lex), so that the high fluid-temperature determination value THs can be calculated by multiplying the high-fluid-temperature determination reference value THsst by the correction factor Kd. The high-fluid-temperature determination reference value THsst may be obtained also from the projected area Apr or the expected load Lex. Further, the high fluid-temperature determination value THs may be set also to a value variable depending on only one of the inter-vehicle distance Dis and the projected area Apr that are the information relating to the preceding vehicle 56 that affects the air flow rate. The high fluid-temperature determination value THs may be calculated also by taking account of other information relating to the preceding vehicle 56 that affects the air flow rate, in place of or in addition to the inter-vehicle distance Dis, projected area Apr and expected load Lex. For example, it is also possible to calculate a width Wpr and a height Hpr of a rear portion of the preceding vehicle 56, for example, from the video image Vfr, and to obtain correction factors Kw, Kh from predefined maps or the like, so that the high fluid-temperature determination value THs can be calculated by multiplying the high-fluid-temperature determination reference value THsst by the correction factor Kw and the correction factor Kl. FIG. 11 shows an example of a map or relational expression for obtaining the correction factor Kw based on the width Wpr. The air flow rate is reduced as the width Wpr as well as the projected area Apr is increased, and the fluid temperature THoil is more likely to be increased with reduction of the air flow rate, so that the correction factor Kw is smaller than 1.0 as the width Wpr is increased, as shown in FIG. 11, whereby the high fluid-temperature determination value THs is lower as the width Wpr is larger. Regarding the height Hpr, too, the air flow rate is reduced as the height Hpr is increased, and the fluid temperature THoil is more likely to be increased with reduction of the air flow rate, so that the correction factor Kh is smaller than 1.0 as the height Hpr is increased, as in FIG. 11, whereby the high fluid-temperature determination value THs is lower as the height Hpr is larger. It is noted that, although the correction factors Ka, Kl, Kw are changed across 1.0 in FIGS. 9, 10 and 11, the correction factors Ka, Kl, Kw may be changed within a range not larger than 1.0, for example, depending on a manner of determining the high-fluid-temperature determination reference value THsst. Further, although the high-fluid-temperature determination reference value THsst and the correction factors Ka, Kl, Kw are changed linearly relative to the inter-vehicle distance Dis, the projected area Apr, the expected load Lex and the width Wpr, respectively, in the map or relational expression of FIGS. 8, 9, 10 and 11, they may be changed in any of various manners such as a polygonal-linear manner and a curved manner, or may be changed in multiple stages such as two and three stages.

In the control routine shown by the flow chart of FIG. 6, step S7 is implemented to determine whether the fluid temperature THoil is at least the high fluid-temperature determination value THs that has been obtained at step S6. When the fluid temperature THoil is not lower than the high fluid-temperature determination value THs (THoil≥THs), step S8 is implemented to select the high-fluid-temperature-state shifting map M2 of FIG. 5. When the fluid temperature THoil is lower than the high fluid-temperature determination value THs (THoil<THs), step S10 is implemented to select the normal-state shifting map M1 of FIG. 4.

Figure 12:
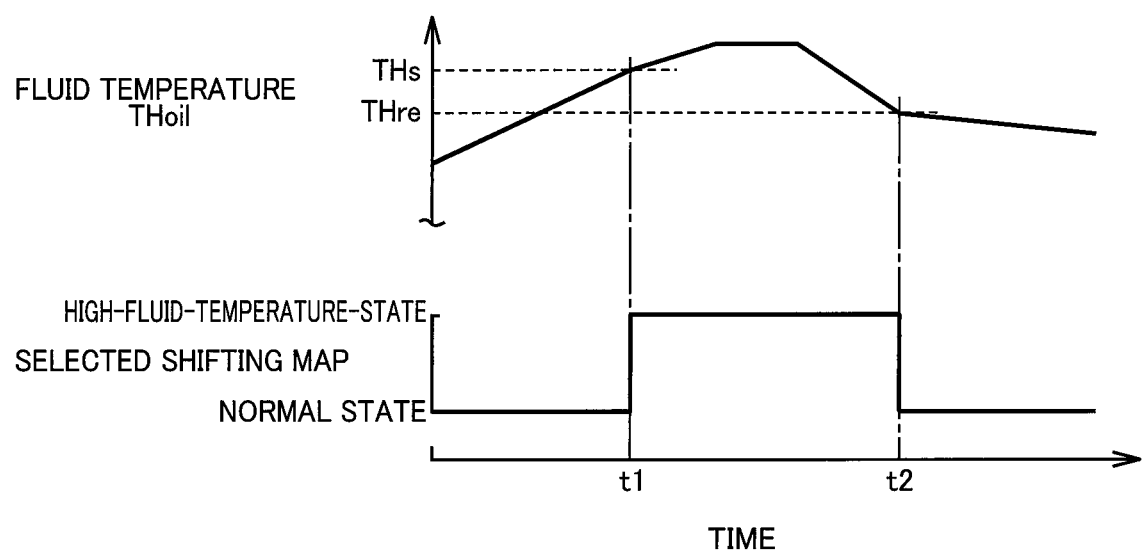
FIG. 12 is a time chart showing, by way of example, change of the fluid temperature THoil in a case in which a shift control is executed with the shifting maps M1 and M2 being switched to each other in accordance with the control routine shown by the flow chart of FIG. 6.

FIG. 12 is a time chart showing, by way of example, change of the fluid temperature THoil in a case in which the shifting maps M1 and M2 are switched to each other in accordance with the control routine shown by the flow chart of FIG. 6 during the follow-up running. In FIG. 12, a time t1 represents a point of time at which an affirmative determination is made at step S7 of the control routine when the fluid temperature THoil becomes not lower than the high fluid-temperature determination value THs, and step S8 is implemented to select the high-fluid-temperature-state shifting map M2. With the normal-state shifting map M1 being switched to the high-fluid-temperature-state shifting map M2, a higher-speed gear position becomes frequently established, whereby the rotational speed of each rotary member of the transmission portion 64 and the rotational speed of the torque converter 62 are reduced, so that it is possible to suppress increase of the fluid temperature due to stirring of the lubrication fluid. Further, when the high-fluid-temperature-state shifting map M2 is being selected, a shift-up action is executed at a lower running speed than when the normal-state shifting map M1 being selected, so that a rotational speed change of the engagement devices CB, which are engaged upon the shift-up action, becomes smaller whereby a load (heat generation) upon engagement of the engagement devices CB is reduced and accordingly increase of the fluid temperature THoil is reduced. Consequently, with the high-fluid-temperature-state shifting map M2 being selected, the fluid temperature THoil is reduced, and the fluid temperature THoil becomes not higher than the returning determination value THre at a time t2 so that an affirmative determination is made at step S9 and then step S10 is implemented to return to the normal-state shifting map M1 (see FIG. 6).

However, when the shift control is executed in accordance with the high-fluid-temperature-state shifting map M2, a higher-speed gear position becomes frequently established, and accordingly each of the engine 32 and the rotating machine MG as the drive power sources is operated frequently in a high torque region, so that a responsiveness to the requested drive torque Trdem could be reduced. As a result, a change of the inter-vehicle distance Dis is increased during the follow-up running, while a change of the requested drive torque Trdem is increased in order to suppress the change of the inter-vehicle distance Dis. The increased change of the requested drive torque Trdem is likely to cause a so-called busy shift, i.e., frequent execution of the shifting action, which could cause the vehicle driver to feel uncomfortable. Therefore, in the present embodiment, the auto-cruise control portion 136 executes signal processing in accordance with a control routine shown by a flow chart of FIG. 7, so as to restrict execution of the follow-up running under a certain condition when the high-fluid-temperature-state shifting map M2 is being selected.

Figure 7:
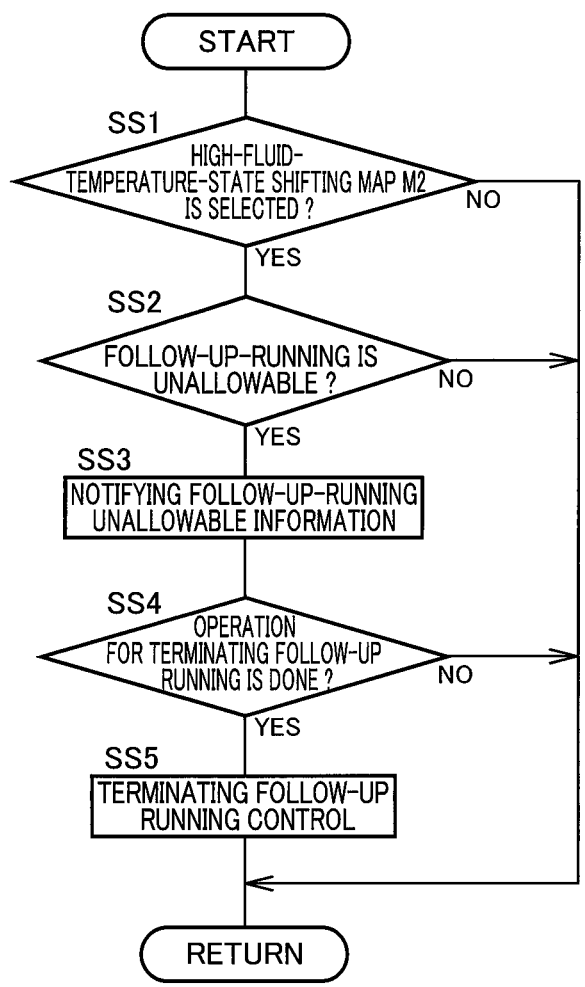
FIG. 7 is a flow chart showing a control routine executed when an auto-cruise control portion included in the in-vehicle control apparatus shown in FIG. 1 terminates a follow-up running control under a certain condition during execution of the shift control using the high-fluid-temperature-state shifting map M2.

As shown in FIG. 7, the control routine is initiated with step SS1 that is implemented to determine whether the high-fluid-temperature-state shifting map M2 is being selected or not. When the high-fluid-temperature-state shifting map M2 is being selected, step SS2 and the subsequent steps are implemented. When the high-fluid-temperature-state shifting map M2 is not being selected, namely, when the normal-state shifting map M1 is being selected, one cycle of execution of the control routine is terminated. At step SS2, it is determined whether continuation of the follow-up running control is appropriate or not, namely, whether a follow-up-running unallowable condition for stopping the follow-up running is satisfied or not in the present embodiment. The follow-up-running unallowable condition is a condition that is satisfied in a vehicle state that is likely to cause the vehicle driver to feel uncomfortable, wherein such a vehicle state includes (i) a state in which the inter-vehicle distance Dis is deviated largely from the target inter-vehicle distance Dt, (ii) a state in which the inter-vehicle distance Dis is deviated from the target inter-vehicle distance Dt by at least a predetermined value for at least a predetermined length of time, (iii) a state in which the inter-vehicle distance Dis is deviated from the target inter-vehicle distance Dt by at least the predetermined value at a high frequency, (iv) a state in which a width of change of torque of the drive power sources consisting of the engine torque Te and the MG torque Tmg is large, and (v) a state in which the change of torque of the drive power sources is caused at a high frequency. When the follow-up-running unallowable condition is satisfied, step SS3 and the subsequent steps are implemented. When the follow-up-running unallowable condition is not satisfied, one cycle of execution of the control routine is terminated.

At SS3, follow-up-running unallowable information for stopping the follow-up running is notified to the vehicle driver by means of sounds, images or the like, on a display device or the like disposed in vicinity of the driver's seat. SS3 is followed by step SS4 that is implemented to determine whether the vehicle driver has done a terminating operation for terminating the follow-up running by using the auto-cruise setting device 110, or not. When the terminating operation has been done, step SS5 is implemented to terminate the follow-up running control. When the terminating operation has not been done, the follow-up running control is continued. When a termination processing has been done for terminating the follow-up running control at step SS5, a negative determination is made at step S1 in the control routine shown by the flow chart of FIG. 6, whereby the control flow goes to step S10 at which the normal-state shifting map M1 is selected so that the shift control of the transmission portion 64 is executed by using the normal-state shifting map M1. Thus, the restriction of the execution of the follow-up running control includes the above arrangement in which the follow-up-running unallowable information is notified to the vehicle driver, and the follow-up running control is terminated provided that the terminating operation has been done by the vehicle driver. It is noted that step SS4 may be omitted so that the follow-up running control can be forcibly terminated, irrespective of whether the terminating operation has been done or not.

As described above, in the shift control portion 134 that is functionally included in the in-vehicle control apparatus 130 of the vehicle 10 in the present embodiment, the high fluid-temperature determination value THs is set to a value variable depending on the information (the inter-vehicle distance Dis and the projected area Apr) relating to the preceding vehicle 56 that affects the air flow rate, during execution of the follow-up running control. When the detected fluid temperature THoil of the transmission portion 64 is not lower than the high fluid-temperature determination value THs (at step S7), the high-fluid-temperature-state shifting map M2 is selected (at step S8) whereby a shift-up action becomes executed at a lower running speed of the vehicle 10, and a higher-speed gear position providing a lower gear ratio γ becomes more frequently established. With a higher-speed gear position being frequently used, the rotational speed (such as the input rotational speed Ni) of each rotary member of the transmission portion 64 and the rotational speed of the torque converter 62 are reduced and accordingly the heat generation due to stirring of the lubrication fluid is suppressed, so that it is possible to suppress increase of the fluid temperature THoil, due to reduction of the cooling performance which could be caused by reduction of the air flow rate during the follow-up running. Particularly, since the high fluid-temperature determination value THs, based on which it is determined whether the shifting maps M1 and M2 are to be switched to each other, is set to a value variable depending on the information relating to the preceding vehicle 56 that affects the air flow rate, it is possible to appropriately suppress increase of the fluid temperature THoil due to reduction of the air flow rate during the follow-up running. Therefore, during the follow-up running, it is possible to enjoy a fuel-efficiency increasing effect owing to the preceding vehicle 56 acting as a windshield for reducing a running resistance, and to suppress the fluid temperature from being excessively increased due to reduction of the air flow rate.

The transmission portion 64 is a step-variable transmission in which a selected one of the gear positions is to be established with the engaged/released states of the plurality of engagement devices CB being controlled. When the high-fluid-temperature-state shifting map M2 is being selected, a shift-up action is executed at a lower running speed than when the normal-state shifting map M1 being selected, so that the rotational speed change of the engagement devices CB, which are engaged upon the shift-up action, becomes smaller whereby the load (heat generation) upon engagement of the engagement devices CB is reduced and accordingly increase of the fluid temperature THoil is reduced in this respect as well.

It is determined whether the fluid temperature THoil is at least the high fluid-temperature determination value THs, which is set at step S6 (see FIG. 6), and the high-fluid-temperature-state shifting map M2 is selected when it is determined that the fluid temperature THoil is not lower than the high fluid-temperature determination value THs. This arrangement makes it possible to easily obtain an effect of the present invention, which is restraining increase of the fluid temperature THoil by reducing the rotational speed of each rotary member of the transmission portion 64.

Further, the inter-vehicle distance Dis to the preceding vehicle 56 from the vehicle 10 is used as the information relating to the preceding vehicle 56 that affects the air flow rate, and the high fluid-temperature determination value THs is set to a value variable depending on the inter-vehicle distance Dis such that the high fluid-temperature determination value THs is lower when the inter-vehicle distance Dis is small than when the inter-vehicle distance Dis is large, so that the increase of the fluid temperature THoil can be appropriately suppressed. That is, since the reduction of the cooling performance due to presence of the preceding vehicle 56 becomes noticeable when the inter-vehicle distance Dis is small, the increase of the fluid temperature THoil can be appropriately suppressed in spite of the reduction of the cooling performance, by reducing the high fluid-temperature determination value THs so as to cause the normal-state shifting map M1 to be switched to the high-fluid-temperature-state shifting map M2 at a lower value of the fluid temperature THoil when the inter-vehicle distance Dis is small.

Further, the projected area Apr of the preceding vehicle 56 as seen from a rear side of the preceding vehicle 56 is used as the information relating to the preceding vehicle 56 that affects the air flow rate, and the high fluid-temperature determination value THs is set to a value variable depending on the projected area Apr such that the high fluid-temperature determination value THs is lower when the projected area Apr is large than when the projected area Apr is small, so that the increase of the fluid temperature THoil can be appropriately suppressed. That is, since the reduction of the cooling performance due to presence of the preceding vehicle 56 becomes noticeable when the projected area Apr of the preceding vehicle 56 is large, the increase of the fluid temperature THoil can be appropriately suppressed in spite of the reduction of the cooling performance, by reducing the high fluid-temperature determination value THs so as to cause the normal-state shifting map M1 to be switched to the high-fluid-temperature-state shifting map M2 at a lower value of the fluid temperature THoil when the projected area Apr of the preceding vehicle 56 is large.

Further, the high fluid-temperature determination value THs is set to a value variable depending on the expected load Lex in addition to the information relating to the preceding vehicle 56 that affects the air flow rate, such that the high fluid-temperature determination value THs is lower when the expected load Lex is large than when the expected load Lex is small, so that the increase of the fluid temperature THoil can be more appropriately suppressed. That is, when the expected load Lex is large, a lower-speed gear position providing a higher gear ratio γ becomes more frequently established whereby the fluid temperature THoil is more likely to be increased. Therefore, the increase of the fluid temperature THoil can be appropriately suppressed in spite of increase of the running load, by reducing the high fluid-temperature determination value THs so as to cause the normal-state shifting map M1 to be switched to the high-fluid-temperature-state shifting map M2 at a lower value of the fluid temperature THoil when the expected load Lex is large.

Further, since the expected load Lex is obtained based on the predetermined running route, it is possible to accurately estimate the expected load Lex, so that the increase of the fluid temperature THoil can be appropriately suppressed by appropriately reducing the high fluid-temperature determination value THs.

Further, during execution of the follow-up running control, the auto-cruise control portion 136 determines whether the follow-up running can be continued or not (at step SS2) when the high-fluid-temperature-state shifting map M2 is selected by the shift control portion 134. When determining that the follow-up running cannot be continued, the auto-cruise control portion 136 notifies the follow-up-running unallowable information to the vehicle driver (at step SS3). Then, provided that the termination operation has been done by the vehicle driver, the auto-cruise control portion 136 terminates the follow-up running control (at steps SS4 and SS5), so that it is possible to avoid problems that could be caused by unreasonable continuation of the follow-up running control, wherein the problems include increase of the change of the inter-vehicle distance Dis, increase of change of the torque of each of the drive power sources and occurrence of the busy shift, which could cause the vehicle driver to feel uncomfortable.

Further, the normal-state shifting map M1 is switched to the high-fluid-temperature-state shifting map M2 when the fluid temperature THoil becomes not lower than the high fluid-temperature determination value THs, and the high-fluid-temperature-state shifting map M2 is returned to the normal-state shifting map M1 when the fluid temperature THoil becomes not higher than the returning determination value THre that is lower than the high fluid-temperature determination value THs. Therefore, it is possible to suppress frequent switching between the shifting maps M1 and M2 by slight fluctuation of the fluid temperature THoil.

Further, when the high fluid-temperature determination value THs is determined at step S6, the width Wpr of the rear portion of the preceding vehicle 56 as the information relating to the preceding vehicle 56 that affects the air flow rate is taken into account, so that the increase of the fluid temperature THoil can be appropriately suppressed, by calculating the high fluid-temperature determination value THs by multiplying the high-fluid-temperature determination reference value THsst by the correction factor Kw that is made smaller than 1.0 with increase of the width Wpr, as shown in FIG. 11. That is, since the reduction of the cooling performance due to presence of the preceding vehicle 56 becomes noticeable when the width Wpr of the preceding vehicle 56 is large, the increase of the fluid temperature THoil can be appropriately suppressed in spite of the reduction of the cooling performance, by reducing the high fluid-temperature determination value THs so as to cause the normal-state shifting map M1 to be switched to the high-fluid-temperature-state shifting map M2 at a lower value of the fluid temperature THoil when the width Wpr of the preceding vehicle 56 is large. Moreover, substantially the same effect can be obtained with the height Hpr of the rear portion of the preceding vehicle 56 as well as the width Wpr being taken into account, by calculating the high fluid-temperature determination value THs by multiplying the high-fluid-temperature determination reference value THsst by the correction factor Kh that is made smaller than 1.0 with increase of the height Hpr.

While the preferred embodiment of this invention has been described in detail by reference to the drawings, it is to be understood the embodiment described above is given for illustrative purpose only, and that the present invention may be embodied with various modifications and improvements which may occur to those skilled in the art.

NOMENCLATURE OF ELEMENTS

10: vehicle
32: engine (drive power source)
56: preceding vehicle
64: transmission portion (automatic transmission)
130: in-vehicle control apparatus (control apparatus)
134: shift control portion
136: auto-cruise control portion (follow-up-running control portion)
MG: rotating machine (drive power source)
M1: normal-state shifting map (normal-state shifting condition)
M2: high-fluid-temperature-state shifting map (high-fluid-temperature-state shifting condition)
THoil: fluid temperature
THs: high fluid-temperature determination value
THre: returning determination value
Dis: inter-vehicle distance
Apr: projected area
Wpr: width
Lex: expected load

What is claimed is:

1. A control apparatus for a vehicle that includes a drive power source and an automatic transmission,
the control apparatus comprising:
a follow-up-running control portion configured to control an output of the drive power source so as to execute a follow-up running control for causing the vehicle to run following a preceding vehicle with a target inter-vehicle distance to the preceding vehicle from the vehicle without requiring an acceleration/deceleration operation by a driver of the vehicle; and
a shift control portion configured to change a gear ratio of the automatic transmission in accordance with a predetermined shifting condition,
wherein, during execution of the follow-up running control by the follow-up-running control portion, the shift control portion is configured to set a high fluid-temperature determination value, based on information relating to the preceding vehicle that affects an air flow rate that is a rate of flow of air to the vehicle, and
wherein, when a detected fluid temperature of the automatic transmission is not lower than the high fluid-temperature determination value, the shift control portion is configured to change the shifting condition depending on the fluid temperature such that a higher-speed gear position making the gear ratio lower is more frequently established in the automatic transmission than when the fluid temperature of the automatic transmission is lower than the high fluid-temperature determination value.

2. The control apparatus according to claim 1,
wherein the information relating to the preceding vehicle includes an inter-vehicle distance to the preceding vehicle from the vehicle, and
wherein the shift control portion is configured to set the high fluid-temperature determination value, depending on the inter-vehicle distance, such that the high fluid-temperature determination value is lower when the inter-vehicle distance is small than when the inter-vehicle distance is large.

3. The control apparatus according to claim 1,
wherein the information relating to the preceding vehicle includes a width of a rear portion of the preceding vehicle, and
wherein the shift control portion is configured to set the high fluid-temperature determination value, depending on the width, such that the high fluid-temperature determination value is lower when the width is large than when the width is small.

4. The control apparatus according to claim 1,
wherein the information relating to the preceding vehicle includes a projected area of the preceding vehicle as seen from a rear side of the preceding vehicle, and
wherein the shift control portion is configured to set the high fluid-temperature determination value, depending on the projected area, such that the high fluid-temperature determination value is lower when the projected area is large than when the projected area is small.

5. The control apparatus according to claim 1,
wherein the shift control portion is configured to set the high fluid-temperature determination value, depending on, in addition to the information relating to the preceding vehicle, an expected load expected in future running of the vehicle, such that the high fluid-temperature determination value is lower when the expected load is large than the expected load is small.

6. The control apparatus according to claim 5,
wherein the expected load is obtained based on a predetermined running route of the vehicle.

7. The control apparatus according to claim 1,
wherein, when the shifting condition has been changed by the shift control portion such that the higher-speed gear position is more frequently established in the automatic transmission, the follow-up-running control portion is configured to determine whether continuation of the execution of the follow-up running control is appropriate or not, and to restrict the execution of the follow-up running control when determining that the continuation of the execution of the follow-up running control is not appropriate.

8. The control apparatus according to claim 1, wherein, when the fluid temperature of the automatic transmission becomes not lower than the high fluid-temperature determination value, the shift control portion is configured to change the shifting condition from a normal-state shifting condition to a high-fluid-temperature-state shifting condition by which the higher-speed gear position is more frequently established in the automatic transmission than by the normal-state shifting condition, and wherein, when the fluid temperature of the automatic transmission becomes not higher than a returning determination value that is lower than high fluid-temperature determination value, the shift control portion is configured to return the shifting condition to the normal-state shifting condition from the high-fluid-temperature-state shifting condition.

\* \* \* \* \*